US012755373B2

(12) United States Patent
Liu et al.

(10) Patent No.: US 12,755,373 B2
(45) Date of Patent: Oct. 6, 2026

(54) METHOD AND DEVICE FOR DEFECT DETECTION

(71) Applicant: CONTEMPORARY AMPEREX TECHNOLOGY (HONG KONG) LIMITED, Hong Kong (CN)

(72) Inventors: Yongfa Liu, Ningde (CN); Guannan Jiang, Ningde (CN); Annan Shu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 238 days.

(21) Appl. No.: 18/639,515

(22) Filed: Apr. 18, 2024

(65) Prior Publication Data

US 2024/0265525 A1 Aug. 8, 2024

Related U.S. Application Data

(63) Continuation of application No. PCT/CN2022/102866, filed on Jun. 30, 2022.

(51) Int. Cl.
*G06V 10/75* (2022.01)
*G06T 7/00* (2017.01)

(52) U.S. Cl.
CPC .................................... *G06T 7/001* (2013.01)

(58) Field of Classification Search
CPC ........ G06T 7/001; G06N 3/045; G06N 20/00; G06V 10/76; G06V 10/82; G06F 18/2411
See application file for complete search history.

(56) References Cited

U.S. PATENT DOCUMENTS

| | | | | |
|---|---|---|---|---|
| 11,205,098 | B1 | 12/2021 | Wu et al. | |
| 2007/0041609 | A1* | 2/2007 | Chung | G06T 7/0004 382/100 |
| 2007/0130557 | A1 | 6/2007 | Luk-Pat et al. | |
| 2015/0227747 | A1* | 8/2015 | Gassi | G06F 21/602 713/193 |

(Continued)

FOREIGN PATENT DOCUMENTS

| | | |
|---|---|---|
| CN | 110672617 A | 1/2020 |
| CN | 112308148 A | 2/2021 |

(Continued)

OTHER PUBLICATIONS

International Search Report for PCT application No. PCT/CN2022/102866, dated Sep. 19, 2022.

(Continued)

*Primary Examiner* — Aaron W Carter
(74) *Attorney, Agent, or Firm* — Ladas & Parry LLP

(57) ABSTRACT

A method and a device for defect detection are provided. The method includes: obtaining a defect eigenvector of an image to be detected; calculating a similarity score of the image to be detected for each known defect type according to the defect eigenvector; and performing defect classification on the image to be detected according to the similarity score. The similarity score between the defect eigenvector of the image to be detected and each known defect type is calculated, and then it is possible to distinguish known defects from unknown defects and accurately classify the known defects according to the similarity scores, so as to effectively detect the defects.

15 Claims, 5 Drawing Sheets

(56) References Cited

U.S. PATENT DOCUMENTS

| | | | | |
|---|---|---|---|---|
| 2016/0381375 | A1* | 12/2016 | Cao | H04N 19/12 382/238 |
| 2020/0294222 | A1* | 9/2020 | Wen | G06T 7/11 |
| 2020/0327654 | A1 | 10/2020 | Zhang et al. | |
| 2020/0380654 | A1 | 12/2020 | Ratner et al. | |
| 2021/0034981 | A1* | 2/2021 | Feng | G06N 3/088 |
| 2021/0201089 | A1* | 7/2021 | Lin | G06V 10/764 |
| 2022/0270373 | A1* | 8/2022 | Yang | G06V 20/52 |
| 2022/0392025 | A1* | 12/2022 | Mironica | G06N 3/045 |
| 2023/0222645 | A1* | 7/2023 | Kurita | G06T 7/0004 382/100 |
| 2024/0249394 | A1* | 7/2024 | Jeon | G06T 5/60 |
| 2024/0265525 | A1* | 8/2024 | Liu | G06N 3/045 |
| 2024/0303798 | A1* | 9/2024 | Ji | G06T 7/00 |
| 2025/0045885 | A1* | 2/2025 | Van Driel | G06T 5/20 |

FOREIGN PATENT DOCUMENTS

| | | | |
|---|---|---|---|
| CN | 112686833 | A | 4/2021 |
| CN | 112766110 | A | 5/2021 |
| CN | 112950606 | A | 6/2021 |
| CN | 114037645 | A | 2/2022 |
| CN | 114359229 | A | 4/2022 |
| CN | 114581388 | A | 6/2022 |
| CN | 114627383 | A | 6/2022 |

OTHER PUBLICATIONS

Written Opinion of International Searching Authority for PCT application No. PCT/CN2022/102866, dated Sep. 19, 2022.

Huang, Jian et al. "Few-Shot Metric Transfer Learning Network for Surface Defect Detection", Pattern Recognition and Artificial Intelligence, vol. 34, No. (5), May 31, 2021.

Tao, Xian et al. "A Survey of Surface Defect Detection Methods Based on Deep Learning", Acta Automatica Sinica, vol. 47, No. 5, May 31, 2021.

Han, Jiangrui, Research on Classification and Detection of Solar Cells EL Defects under Class Imbalance Situation, Engineering Science and Technology II, China Master's Theses full-text database, No. 3, Mar. 15, 2022 (english abstract).

Thomas, Schlegl et al, "Unsupervised Anomaly Detection with Generative Adver-sarial Networks to Guide Marker Discovery", International Conference on Information Processing in Medical Imaging, IPMI 2017, vol. 10265, May 23, 2017.

Extended European Search Report for EP application No. 22948525.5, dated Jan. 31, 2025.

A Malhi et al. "PCA-Based Feature Selection Scheme for Machine Defect Classification", IEEE Transaction on Instrumentation and Measurement, vol. 53, No. 6, p. 1517-1525, Dec. 2004.

First Office Action of CN application No. 202280048956.1, dated May 30, 2026.

* cited by examiner

METHOD AND DEVICE FOR DEFECT DETECTION

CROSS-REFERENCE TO RELATED APPLICATION

The present application is a continuation of International Patent Application No. PCT/CN2022/102866, filed on Jun. 30, 2022, which is incorporated herein by reference in its entirety.

TECHNICAL FIELD

The present application relates to the technical field of image processing, in particular to a method and device for defect detection.

BACKGROUND

In the field of modern industrial manufacturing, industrial products may have one or more defects thanks to technologies, equipment, and various production processes. The defect detection of the industrial products is a key process in quality control of the industrial products.

At present, common detection methods cannot recognize unknown defects that have not occurred in a data set, which may lead to incorrect classification of the unknown defects or missed detection, thus not contributing to quality control of industrial products. Therefore, a method for defect detection that can effectively detect defects is urgently needed.

SUMMARY

The present application provides a method and device for defect detection, which can effectively detect defects, thus improving the accuracy of defect detection.

In a first aspect, a method for defect detection is provided, including: obtaining a defect eigenvector of an image to be detected; calculating a similarity score of the image to be detected for each known defect type according to the defect eigenvector; and performing defect classification on the image to be detected according to the similarity score.

In the technical solutions of the present application, the similarity score between the defect eigenvector of the image to be detected and each known defect type is calculated, and then it is possible to distinguish known defects from unknown defects and accurately classify the known defects according to the similarity score, so as to effectively detect the defects, which improves the accuracy of defect detection.

In some possible embodiments, the calculating a similarity score of the image to be detected for each known defect type according to the defect eigenvector includes: mapping the defect eigenvector into a trained eigenvector space, where the trained eigenvector space includes a distribution position of a defect eigenvector of the known defect type; and calculating a distance between the defect eigenvector and the defect eigenvector of the known defect type, so as to obtain the similarity score of the image to be detected for each known defect type.

According to the above embodiment, the trained eigenvector space is an optimized eigenvector space; after the defect eigenvector of the image to be detected is mapped into the optimized eigenvector space, a distribution of the defect eigenvector in the optimized eigenvector space can be seen intuitively; and high-precision defect similarity measurement can be implemented by calculating the distance from the known eigenvector, so as to complete the detection of the unknown defects and the classification of the defects.

In some possible embodiments, the performing defect classification on the image to be detected according to the similarity scores includes: if a maximum similarity score in similarity scores is not less than a similarity threshold, outputting a defect type corresponding to the maximum similarity score; or if the similarity scores are all less than the similarity threshold, outputting an unknown defect type.

According to the above embodiment, it can be determined whether defects in the image to be detected are known or unknown defects through the similarity threshold, and the image to be detected is subjected to accurate classification through the maximum similarity score when the defects are the known defects, which can improve the accuracy of defect classification.

In some possible embodiments, the method further includes: outputting the similarity score corresponding to the defect type.

According to the above embodiment, the similarities between the defects in the image to be detected and the known defect types can be intuitively seen by outputting the similarity score corresponding to the defect type, which contributes to determining whether the defect detection is accurate through manual confirmation by a staff according to the similarity scores, so as to ensure the accuracy of defect classification.

In some possible embodiments, the obtaining a defect eigenvector of an image to be detected includes: obtaining the defect eigenvector by an encoding module.

According to the above embodiment, the defect eigenvectors of the image to be detected can be fully extracted by the encoding module, such that complex defects occurring in various production processes can be accurately and effectively detected, thus improving the accuracy of defect classification; and the unknown defects can be discovered in a timely manner through the fully extracted defect eigenvectors.

In some possible embodiments, the encoding module includes a plurality of encoding sublayers, the plurality of encoding sublayers being connected by a maximum pooling layer; and the obtaining the defect eigenvector by an encoding module includes: inputting the image to be detected to the encoding module, so as to obtain feature maps of the sublayers that correspond to the plurality of encoding sublayers; and converting a feature map of a final sublayer in the feature maps of the sublayers into the defect eigenvector.

According to the above embodiment, the encoding module, through the encoding sublayers and a maximum pooling operation, can continuously increase the dimension of the defect eigenvector and implement full extraction of the defect eigenvector, such that complex defects occurring in various production processes can be accurately and effectively detected, thus improving the accuracy of defect classification; and the unknown defects can be discovered in a timely manner through the fully extracted defect eigenvectors.

In some possible embodiments, the method further includes: obtaining defect position information of the image to be detected by a decoding module.

According to the above embodiment, the image to be detected can be subjected to pixel-level defect segmentation by the decoding module, and thus the position information of the defect is obtained according to a pixel position of the defect.

In some possible embodiments, the decoding module includes a plurality of decoding sublayers, the plurality of decoding sublayers being connected through deconvolution and corresponding to the plurality of encoding sublayers; and the obtaining defect position information of the image to be detected by a decoding module includes: inputting the defect eigenvector to the decoding module, so as to obtain feature maps corresponding to the plurality of decoding sublayers, where a feature map of a final sublayer in the plurality of decoding sublayers includes the defect position information.

According to the above embodiment, the decoding module inputs the defect eigenvector of the image to be detected to each decoding sublayer, the feature maps with pixel tags can be restored through the deconvolution among the decoding sublayers, and the defects in the feature maps can be segmented according to the tags. Because each pixel has its own position coordinate, the defect can be subjected to pixel-level positioning while being segmented through the feature map with the pixel tag.

In some possible embodiments, before the calculating a similarity score of the image to be detected for each known defect type according to the defect eigenvector, the method further includes: obtaining a plurality of known defect sample images; and training an eigenvector space by using the known defect sample images, so as to obtain the trained eigenvector space.

According to the above embodiment, the eigenvector space of the known defects can be optimized through the known defect sample images, such that the defect eigenvector of the image to be detected is better mapped into the eigenvector space, thus improving the accuracy of defect detection.

In some possible embodiments, the training an eigenvector space by using the known defect sample images, so as to obtain the trained eigenvector space includes: obtaining known defect eigenvectors of the plurality of known defect sample images by the encoding module; and minimizing a distance between the known defect eigenvectors of a same type and maximizing a distance between the known defect eigenvectors of different types in a metric learning function.

According to the above embodiment, the defect eigenvectors of the known defects are fully extracted using the encoding module, such that the eigenvector space can be trained using fewer sample images. Then the eigenvector space is optimized in combination with metric learning. The eigenvector space with more reasonable position distribution can be obtained by minimizing the distance between the defect eigenvectors of the same defect type and maximizing the distance between the defect eigenvectors of different types or with a great difference in feature, such that high-precision similarity measurement is performed on the defects of the image to be detected, thus improving the accuracy of defect classification or implementing effective detection of the unknown defects.

In a second aspect, a device for defect detection is provided, including an obtaining unit and a processing unit, where the obtaining unit is configured to obtain a defect eigenvector of an image to be detected; and the processing unit is configured to calculate a similarity score of the image to be detected for each known defect type according to the defect eigenvector, and to perform defect classification on the image to be detected according to the similarity scores.

In the technical solutions of the present application, the similarity score between the defect eigenvector of the image to be detected and each known defect type is calculated, and then it is possible to distinguish known defects from unknown defects and accurately classify the known defects according to the similarity scores, so as to effectively detect the defects, which improves the accuracy of defect detection.

In some possible embodiments, the processing unit is further configured to: map the defect eigenvector into a trained eigenvector space, wherein the trained eigenvector space comprises a distribution position of a defect eigenvector of the known defect type; and calculate a distance between the defect eigenvector and the defect eigenvector of the known defect type, so as to obtain the similarity score of the image to be detected for each known defect type.

According to the above embodiment, the trained eigenvector space is an optimized eigenvector space; after the defect eigenvector of the image to be detected is mapped into the optimized eigenvector space, a distribution of the defect eigenvector in the optimized eigenvector space can be seen intuitively; and high-precision defect similarity measurement can be implemented by calculating the distance from the known eigenvector, so as to complete the detection and classification of the unknown defects.

In some possible embodiments, the device further includes an output unit, where the output unit is configured to: if a maximum similarity score in the similarity scores is not less than a similarity threshold, output a defect type corresponding to the maximum similarity score; or if the similarity scores are all less than the similarity threshold, output unknown defect types.

According to the above embodiment, it can be determined whether defects in the image to be detected are known or unknown defects through the similarity threshold, and the image to be detected is subjected to accurate classification through the maximum similarity score when the defects are the known defects, which can improve the accuracy of defect classification.

In some possible embodiments, the output unit is further configured to output the similarity scores corresponding to the defect types.

According to the above embodiment, the similarities between the defects in the image to be detected and the known defect types can be intuitively seen by outputting the similarity scores corresponding to the defect types, which contributes to determining whether the defect detection is accurate through manual confirmation by a staff according to the similarity scores, so as to ensure the accuracy of defect classification.

In some possible embodiments, the obtaining unit is further configured to obtain the defect eigenvector by an encoding module.

According to the above embodiment, the defect eigenvectors of the image to be detected can be fully extracted by the encoding module, such that complex defects occurring in various production processes can be accurately and effectively detected, thus improving the accuracy of defect classification; and the unknown defects can be discovered in a timely manner through the fully extracted defect eigenvectors.

In some possible embodiments, the encoding module includes a plurality of encoding sublayers, the plurality of encoding sublayers being connected by a maximum pooling layer; and the processing unit is configured to input the image to be detected to the encoding module, so as to obtain feature maps of the sublayers that correspond to the plurality of encoding sublayers, and to convert a feature map of a final sublayer in the feature maps of the sublayers into the defect eigenvector.

According to the above embodiment, the encoding module, through the encoding sublayers and a maximum pooling operation, can continuously increase the dimension of the defect eigenvector and implement full extraction of the defect eigenvectors, such that complex defects occurring in various production processes can be accurately and effectively detected, thus improving the accuracy of defect classification; and the unknown defects can be discovered in a timely manner through the fully extracted defect eigenvectors.

In some possible embodiments, the obtaining unit is further configured to obtain defect position information of the image to be detected by a decoding module.

According to the above embodiment, the image to be detected can be subjected to pixel-level defect segmentation by the decoding module, and thus the position information of the defect is obtained according to a pixel position of the defect.

In some possible embodiments, the decoding module includes a plurality of decoding sublayers, the plurality of decoding sublayers being connected through deconvolution and corresponding to the plurality of encoding sublayers; and the processing unit is further configured to input the defect eigenvector to the decoding module, so as to obtain feature maps corresponding to the plurality of decoding sublayers, where a feature map of a final sublayer in the plurality of decoding sublayers includes the defect position information.

According to the above embodiment, the decoding module inputs the defect eigenvector of the image to be detected to each decoding sublayer, the feature maps with pixel tags can be restored through the deconvolution among the decoding sublayers, and the defects in the feature maps can be segmented according to the tags. Because each pixel has its own position coordinates, the defect can be subjected to pixel-level positioning while being segmented through the feature map with the pixel tag.

In some possible embodiments, the obtaining unit is further configured to obtain a plurality of known defect sample images; and the processing unit is further configured to train an eigenvector space by using the known defect sample images, so as to obtain the trained eigenvector space.

According to the above embodiment, the eigenvector space of the known defects can be optimized through the known defect sample images, such that the defect eigenvector of the image to be detected is better mapped into the eigenvector space, thus improving the accuracy of defect detection.

In some possible embodiments, the processing unit is further configured to obtain defect eigenvectors of the plurality of known defect sample images by the encoding module, and to minimize a distance between the known defect eigenvectors of a same type and maximize a distance between the known defect eigenvectors of different types in a metric learning function.

According to the above embodiment, the defect eigenvectors of the known defects are fully extracted using the encoding module, such that the eigenvector space can be trained using fewer sample images. Then the eigenvector space is optimized in combination with metric learning. The eigenvector space with more reasonable position distribution can be obtained by minimizing the distance between the defect eigenvectors of the same defect type and maximizing the distance between the defect eigenvectors of different types or with a great difference in feature, such that high-precision similarity measurement is performed on the defects of the image to be detected, thus improving the accuracy of defect classification or implementing effective detection of the unknown defects.

In a third aspect, an apparatus for defect detection is provided, including a processor and a memory, where the memory is configured to store a program, and the processor is configured to call the program from the memory and run the program to perform the method for defect detection in the above first aspect or any one possible embodiment of the first aspect.

In a fourth aspect, a computer-readable storage medium is provided, including a computer program, where the computer program, when run on a computer, causes the computer to perform the method for defect detection in the above first aspect or any one possible embodiment of the first aspect.

In a fifth aspect, a computer program product including an instruction is provided, where the instruction, when executed by a computer, causes the computer to perform the method for defect detection in the above first aspect or any one possible embodiment of the first aspect.

BRIEF DESCRIPTION OF THE DRAWINGS

To more clearly illustrate the technical solutions in the embodiments of the present application, the accompanying drawings that need to be used in the embodiments of the present application will be briefly introduced below. Apparently, the accompanying drawings described below merely illustrate some embodiments of the present application. Those of ordinary skill in the art may also derive other accompanying drawings from the accompanying drawings without creative efforts.

DETAILED DESCRIPTION

The following further describes the implementations of the present application in detail with reference to the accompanying drawings and embodiments. Detailed description of the following embodiments and accompanying drawings are used to illustratively state the principles of the present application, but not to limit the scope of the present application, that is, the present application is not limited to the embodiments described.

The embodiments of the present application can be applicable to image processing systems, including but not limited to products based on infrared imaging. A system for defect detection can be applied to various electronic devices with devices for defect detection, such as personal computers, computer workstations, smart phones, tablet computers, smart cameras, media consumption devices, wearable devices, set-top boxes, game consoles, augmented reality (AR)/virtual reality (VR) devices, and vehicle terminals, which is not limited in the embodiments disclosed in the present application.

It should be understood that the specific examples herein are only intended to assist those skilled in the art to better understand the embodiments of the present application, but not to limit the scope of the embodiments of the present application.

It should also be understood that in various embodiments of the present application, the sequence number of each process does not mean an execution sequence, and the execution sequence of each process should be determined based on its function and internal logic and should not constitute any limitation to the implementation process of the embodiments of the present application.

It should also be understood that various embodiments described in this specification can be implemented separately or in combination, which is not limited in the embodiments of the present application.

All technical and scientific terms used in the embodiments of the present application have the same meanings as commonly understood by those skilled in the art of the present application, unless otherwise stated. The terms used in the present application are only used for describing specific embodiments, and are not intended to limit the scope of the present application. The term "and/or" used in the present application includes any and all combinations of one or more related listed items.

Figure 1:
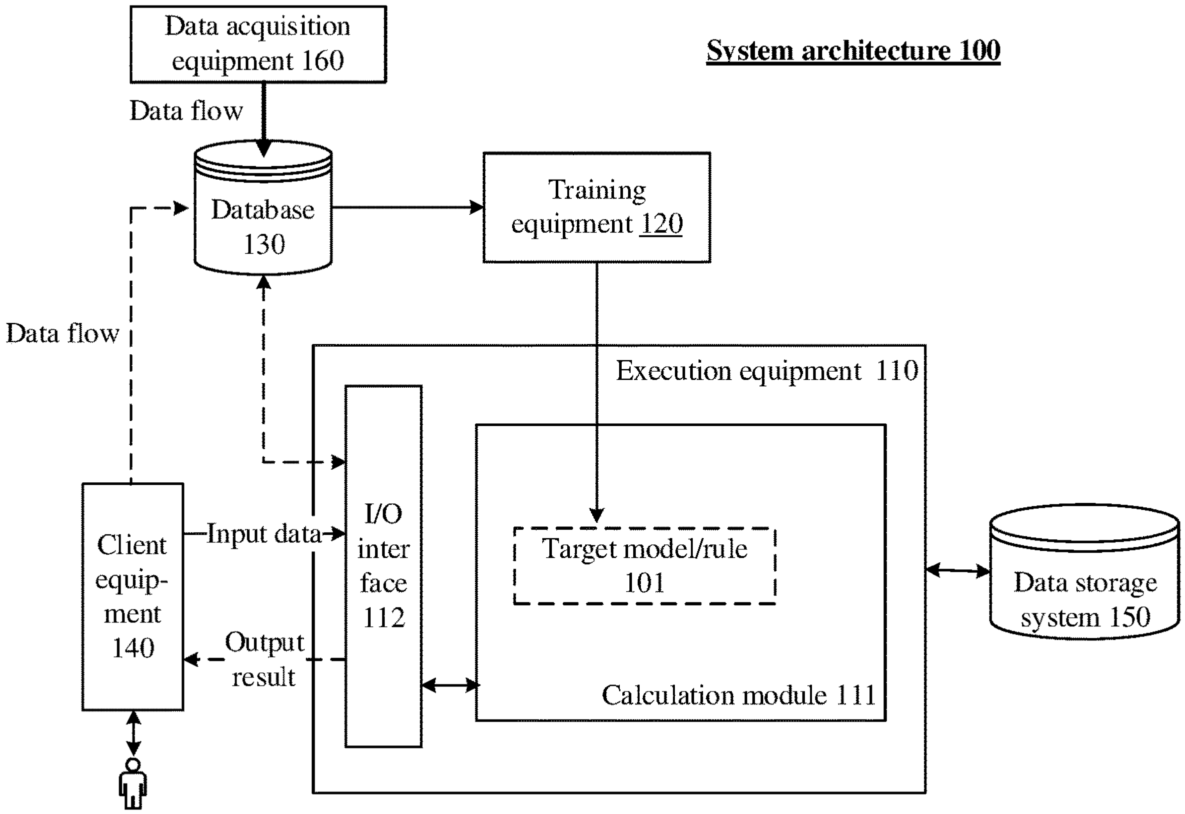
FIG. 1 is a schematic structural diagram of a system architecture provided in the present application.

To better understand the solutions in the embodiments of the present application, the following will first briefly introduce possible application scenarios in the embodiments of the present application with reference to FIG. 1.

As shown in FIG. 1, an embodiment of the present application provides a system architecture 100. In FIG. 1, a data acquisition equipment 160 is configured to acquire known defect sample images. For a method for defect detection according to an embodiment of the present application, the known defect sample images may include sample images with one or more defects, and the defect types in the sample images are known.

After acquiring the known defect sample images, the data acquisition equipment 160 stores these known defect sample images in a database 130, and a training equipment 120 performs training based on the known defect sample images maintained in the database 130 to obtain a target model/rule 101.

The above target model/rule 101 can be used to implement the method for defect detection according to the embodiment of the present application. The target model/rule 101 in the embodiment of the present application may specifically be a neuron network. It should be noted that in practical application, the known defect sample images maintained in the database 130 are not necessarily acquired by the data acquisition equipment 160 and may be received from other devices. Furthermore, it should be noted that the training equipment 120 does not necessarily perform training of the target model/rule 101 entirely based on the known defect sample images maintained in the database 130, and may obtain the known defect sample images from a cloud or other places to perform model training. The above description should not be used as a limitation to the embodiment of the present application.

The target model/rule 101 obtained through training by the training equipment 120 can be applied to different systems or devices, such as an execution device 110 shown in FIG. 1. The execution device 110 may be a terminal, such as a mobile terminal, a tablet computer, and a laptop, or may be a server or a cloud. In FIG. 1, the execution equipment 110 is configured with an input/output (I/O) interface 112 for data interaction with external devices. A user can input data to the I/O interface 112 by a client device 140. The input data in the embodiment of the present application may include an image to be detected input by the client device 140.

In some embodiments, the client device 140 may be the same as the above execution equipment 110, for example, both the client device 140 and the above execution equipment 110 may be a terminal device.

In some other embodiments, the client device 140 may be different from the above execution equipment 110, for example, the client device 140 is a terminal device, while the execution equipment 110 is a device such as a cloud and a server. The client device 140 may interact with the execution equipment 110 through a communication network of any communication mechanism/communication standard, where the communication network may be a wide area network, a local area network, a point-to-point connection, or any combination thereof.

A calculation module 111 of the execution equipment 110 is configured to perform processing according to the input data (such as the image to be detected) received by the I/O interface 112. During the process that the calculation module 111 of the execution equipment 110 executes related processing such as calculation, the execution equipment 110 can call data, codes, etc. in a data storage system 150 for corresponding processing, or store data, instructions, etc. obtained by corresponding processing in the data storage system 150.

Finally, the I/O interface 112 returns a processing result, such as a defect classification result obtained above, to the client device 140, so as to provide the result to the user.

It is worth noting that the training equipment 120 can generate corresponding target models/rules 101 based on different training data for different targets or tasks. The corresponding target models/rules 101 can be used to achieve the above targets or complete the above tasks, so as to provide the user with required results.

In the case shown in FIG. 1, the user can manually give the input data through an interface provided by the I/O interface 112. In another case, the client device 140 can automatically send the input data to the I/O interface 112. If the client device 140 is required to automatically send the input data under the authorization of the user, the user can set a corresponding authority in the client device 140. The user can check the result output by the execution equipment 110 on the client equipment 140 that may be presented in the specific form of display, sounds, and actions. The client equipment 140 may also serve as a data acquisition terminal to acquire the input data from the I/O interface 112 and the output result from the I/O interface 112, as shown in the figure, as new sample data, and to store the data in the database 130. Certainly, it is also possible to directly store the input data from the I/O interface 112 and the output result from the I/O interface 112, as shown in the figure, as new sample data in the database 130 through the I/O interface 112 without acquisition by the client equipment 140.

It is worth noting that FIG. 1 is only a schematic diagram of a system architecture provided in an embodiment of the present application, and the positional relationships among the devices, the components, the modules, etc. shown in the figure do not constitute any limitations. For example, in FIG. 1, the data storage system 150 is an external memory relative to the execution equipment 110. In another case, the data storage system 150 may be placed in the execution equipment 110.

As shown in FIG. 1, the target model/rule 101 is obtained through training by the training equipment 120. The target model/rule 101 in the embodiment of the present application may be a neuron network. Specifically, the neuron network in the embodiment of the present application may be a convolutional neuron network (CNN), a region convolutional neuron network (RCNN), or other types of neuron networks, which is not specifically limited in the present application.

At present, traction batteries have been used more and more widely. The traction batteries are not only used in primary power systems such as water conservancy, wind power, thermal power, and solar power plants, but also widely used in various fields of electric means of transportation such as electric bicycles, electric motorcycles, and electric vehicles, military equipment, aerospace and the like. With the continuous expansion of the application field of the traction batteries, the market demand for the power batteries is also expanding. During production of the traction batteries, different defects, such as anode die-cutting, cathode die-cutting, winding, and gravure, may occur in various processes and need to be automatically detected using the visual technology. Conventional methods for defect detection cannot recognize unknown defects that have not occurred in a known defect data set, which may easily lead to incorrect classification or missed detection of the unknown defects; and it is difficult for the conventional methods for defect detection to accurately recognize various complex defects in various production processes, which does not contribute to production quality control of the traction batteries.

In view of this, an embodiment of the present application provides a method for defect detection. A similarity score between a defect eigenvector of each known defect type and a defect eigenvector of an image to be detected is calculated, and then it is possible to effectively distinguish known defects from unknown defects and accurately classify the known defects according to the similarity scores, so as to effectively detect the defects, which improves the accuracy of defect detection.

The method and device for defect detection provided in the embodiments of the present application may be applied to but not limited to the defect detection of traction batteries, and may also be applied to the defect detection of various other types of products in modern industrial manufacturing. Main processes of the method for defect detection according to the embodiment of the present application are described below with reference to FIG. 2.

Figure 2:
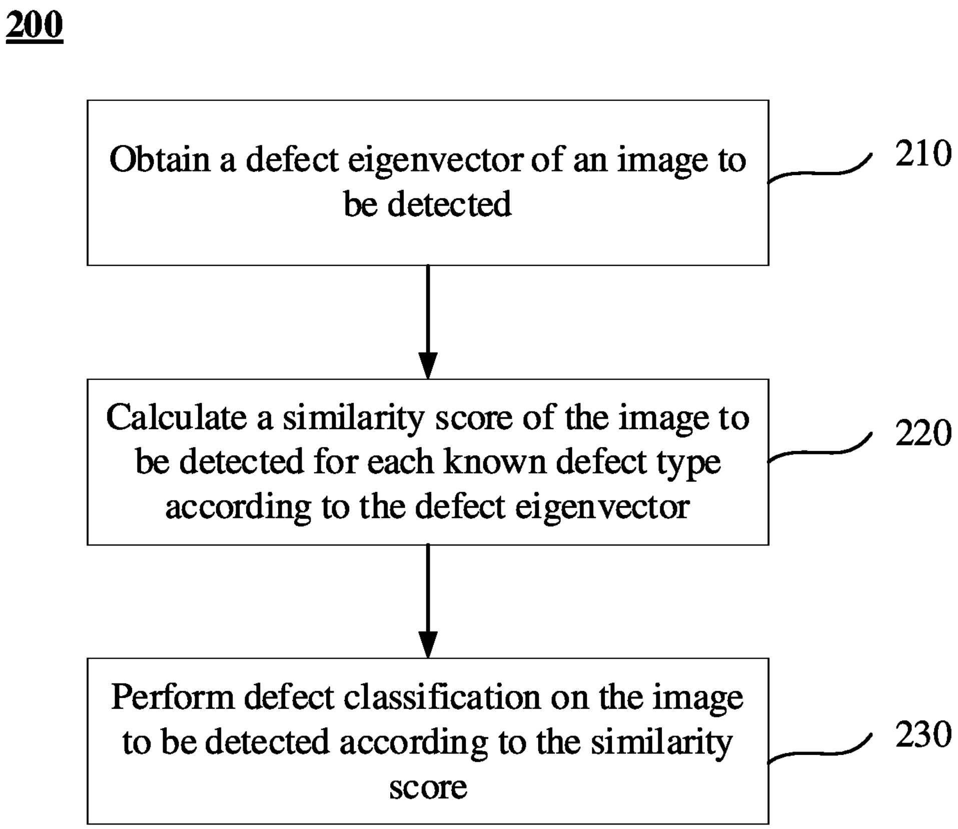
FIG. 2 is a schematic flowchart of a method for defect detection disclosed by an embodiment of the present application.

FIG. 2 shows a schematic flowchart of a method 200 for defect detection according to an embodiment of the present application. The method 200 for defect detection includes steps below.

In 210, a defect eigenvector of an image to be detected is obtained.

Specifically, in step 210, the image to be detected may be a picture taken by a charge coupled device (CCD) camera or another camera, which is not limited in the present application. The production of a traction battery generally includes a plurality of production processes. When entering the final process, the traction battery can be taken using the CCD camera to form the image to be detected.

The eigenvector can be used for picture retrieval. Pictures with similar eigenvectors through comparison are pictures of a same type. The defect eigenvector of the image to be detected can be extracted through a neuron network.

In 220, a similarity score of the image to be detected for each known defect type is calculated according to the defect eigenvector.

In 230, classification is performed on the image to be detected according to the similarity scores.

Specifically, after the similarity score between the defect eigenvector and each known defect type is calculated, if the similarity scores are all relatively low, it indicates that the correlations between the defects and the known defect types are all not high, and it can be determined that the defects are unknown defects. The unknown defects may be defect types that have not been collected in a database, new defect types, or abnormal defect types. When the defects of the image to be detected are known defects, accurate classification can be performed on the image to be detected according to the similarity scores.

In the technical solution of the present application, the similarity score between the defect eigenvector of the image to be detected and each known defect type is calculated, and then it is possible to distinguish the known defects from the unknown defects and accurately classify the known defects according to the similarity scores, so as to effectively detect the defects. That is, when all the similarity scores are less than a preset threshold, the defects are the unknown defects or the new defects. In addition, a classification effect of the defects may be intuitively seen according to the similarity scores.

Optionally, in some embodiments, the calculating a similarity score of the image to be detected for each known defect type according to the defect eigenvector in step 220 may include: mapping the defect eigenvector into a trained eigenvector space, where the trained eigenvector space includes a distribution position of a defect eigenvector of the known defect type; and calculating a distance between the defect eigenvector and the defect eigenvector of the known defect type, so as to obtain the similarity score of the image to be detected for each known defect type.

The trained eigenvector space includes the distribution position of the defect eigenvector of the known defect type, which may be in a state where the defect eigenvectors of a same defect type are close to each other and the defect eigenvectors of different defect types are far away from each other. That is, the trained eigenvector space is an eigenvector space domain optimized based on the known defects. When the defect eigenvector of the image to be detected is mapped into the trained eigenvector space, the distance between the defect eigenvector and the defect eigenvector of each known defect type can be calculated as a similarity score standard. The shorter the distance is, the higher the similarity score is. Specifically, if the defect in the image to be detected belongs to the known type of defect in the database, the defect eigenvector of the image to be detected will be aggregated with the defect eigenvector having the same type as it in the eigenvector space, and the distance therebetween is very short, such that the similarity score calculated during detection will be high, and thus the defect will be accurately classified into the correct defect type; if the defect in the image to be detected does not belong to the defect type in the database or is the abnormal defect, the defect eigenvector of the image to be detected will be far away from other eigenvectors in the eigenvector space, such that the calculated similarity score is relatively low; and when all the similarity scores are less than the preset threshold, it can be determined that the defects are the unknown defects, such that the unknown defects or the abnormal defects can be effectively detected.

A distribution of the defect eigenvector in the eigenvector space can be seen intuitively by mapping the defect eigenvector of the image to be detected into the trained eigenvector space, and high-precision defect similarity measurement can be implemented by calculating the distance from the known eigenvector, so as to complete the detection of the unknown defects and the classification of the defects.

Optionally, in some embodiments, if a maximum similarity score in the similarity scores is not less than a similarity threshold, a defect type corresponding to the maximum similarity score is output; or if the similarity scores are all less than the similarity threshold, unknown defect types are output.

The similarity threshold may be a preset value. For different clients, there may be different standards for distinguishing the defects, and the different clients can set different similarity thresholds according to their requirements.

The similarity threshold is used as a lowest determination threshold to determine whether the defects in the image to be detected are the known defects or the unknown defects. If all the similarity scores are less than the similarity threshold, it indicates that the defects in the image to be detected have low similarity with all the known defects, and belong to the unknown defect types or new defects that have not occurred. If there are a plurality of similarity scores greater than the similarity threshold, a defect type with a highest similarity score is selected as the defect type of the image to be detected. If there is only one similarity score greater than the similarity threshold, a defect type corresponding to the similarity score is the defect type of the image to be detected.

Optionally, when the defect in the image to be detected is the unknown defect, an unknown defect warning indication may also be output, such that a staff can quickly discover and solve the problem with the unknown defect.

Optionally, in some embodiments, the method 200 may further include: outputting the similarity scores corresponding to the defect types.

According to the above embodiment, the similarities between the defects in the image to be detected and the known defect types can be intuitively seen by the user through outputting the similarity scores corresponding to the defect types while the defect types are output, which contributes to determining whether the defect detection is accurate through manual confirmation by the staff according to the similarity scores, so as to ensure the accuracy of defect classification.

Optionally, in some embodiments, when a defect eigenvector of an image to be detected is obtained in step 210, the defect eigenvector can be extracted by an encoding module.

It should be noted that the encoding module provided in the present application may be an encoder network of a UNet network. The UNet network includes an encoder network and a decoder network. When performing semantic segmentation, the UNet network first performs downsampling by using a convolutional layer in the encoder network to extract features of a plurality of layers, then performs upsampling by using the features of the plurality of layers, and finally obtains an image with a tag for each pixel. According to the present application, the defect eigenvector of the image to be detected can be extracted through the encoder network of the UNet network, so as to implement full extraction of defect eigenvectors.

Figure 3:
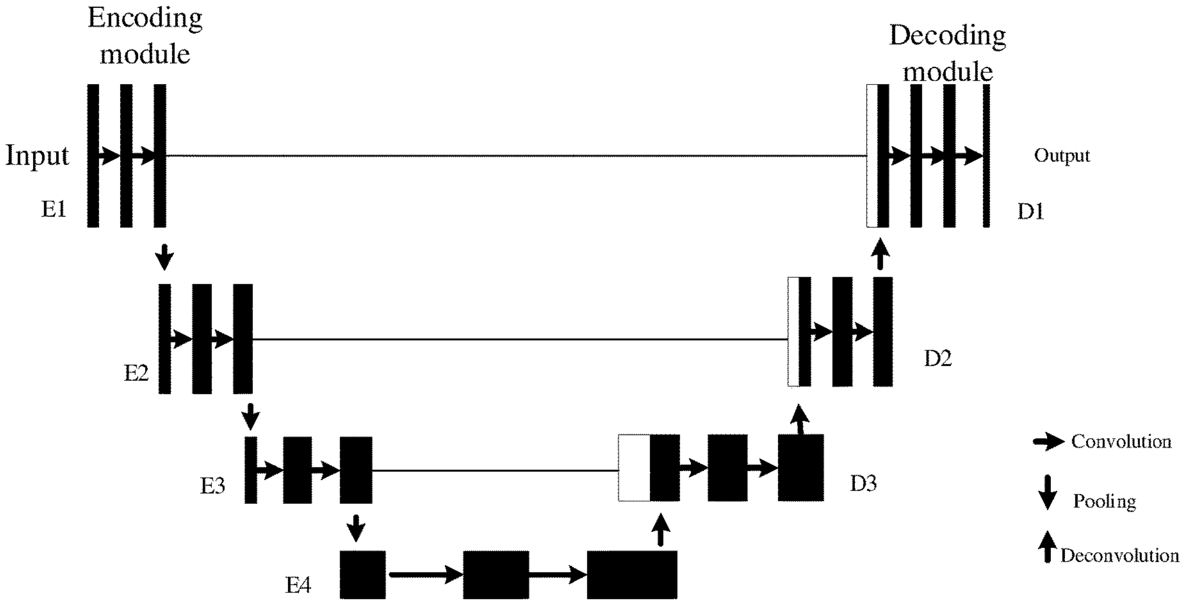
FIG. 3 is a schematic structural diagram of an encoding module and a decoding module disclosed in an embodiment of the present application.

Optionally, in some embodiments, as shown in FIG. 3, the encoding module may include a plurality of encoding sublayers, the plurality of encoding sublayers being connected by a maximum pooling layer; and the image to be detected is input to the encoding module, so as to obtain feature maps of the sublayers that correspond to the plurality of encoding sublayers, and a feature map of a final sublayer in the feature maps of the sublayers is converted into the defect eigenvector.

As shown in FIG. 3, four encoding sublayers are used as an example, where the four encoding sublayers are called E1, E2, E3, and E4 from shallow to deep, each encoding sublayer can be formed by splicing two convolutional layers, the adjacent encoding sublayers can be connected through the maximum pooling layer or downsampling, and the feature map output by each encoding sublayer is different, that is, a plurality of layers of feature maps are obtained. In the embodiment of the present application, the feature map of the final layer, that is, the feature map output by E4, can be converted into an eigenvector as the defect eigenvector of the image to be detected, which is used to be mapped into the trained eigenvector space for defect classification.

It should be noted that the number of encoding sublayers may also be another number, which is not limited in the present application.

The encoding sublayers are connected to each other through maximum pooling, which can enhance the connection between the sublayers. When the encoding module performs convolution and maximum pooling operations on the image to be detected, the dimension of the defect eigenvector can be continuously increased to implement full extraction of complex defect eigenvectors in production processes of a product, so as to effectively detect complex defects; and the accuracy of defect classification can be effectively improved according to the fully extracted defect eigenvectors.

Optionally, in some embodiments, the method 200 may further include: obtaining defect position information of the image to be detected by a decoding module.

It should be understood that the decoding module provided in the present application is a decoder network of the UNet network. The UNet network is a semantic segmentation network. According to the present application, pixel-level defects of the image to be detected can be segmented through the decoder network of the UNet network, so as to obtain the defect position information of the image to be detected.

Optionally, in some embodiments, as shown in FIG. 3, the decoding module includes a plurality of decoding sublayers, the plurality of decoding sublayers being connected through deconvolution and corresponding to the plurality of encoding sublayers; and the defect eigenvector extracted by the encoding module is input to the decoding module, so as to obtain feature maps corresponding to the plurality of decoding sublayers, where a feature map of a final sublayer in the plurality of decoding sublayers includes the defect position information.

As shown in FIG. 3, three decoding sublayers are used as an example, where the three decoding sublayers are called D1, D2, and D3 from shallow to deep, each decoding sublayer can be formed by splicing two convolutional layers, the adjacent decoding sublayers can be connected through the deconvolution, namely, a transposed convolutional layer, and E4 and D3 are also connected through the deconvolution. The encoding sublayers and the decoding sublayers located at a same depth have a same feature map size. The feature map of the final sublayer in the plurality of decoding sublayers above refers to a feature map output by a shallowest decoding sublayer, namely, a feature map output by E1.

After the defect eigenvector extracted by the encoding module is input to the decoding module, the plurality of decoding sublayers will perform deconvolution and upsampling operations on the defect eigenvector, and each decoding sublayer will be concatenated with the feature map output by the encoding sublayer corresponding to the decoding sublayer. The shallowest decoding sublayer E1 will output a feature map with a pixel tag. That is to say, each pixel in the final feature map has a tag, such that the defect in the feature map can be segmented according to the tag.

It should be noted that the pixel refers to a smallest unit in an image represented by a digital sequence. The image to be detected or the feature map is composed of a plurality of pixels, each with its own position coordinates and color values. Because each pixel has its own position coordinates, the defect can be positioned while being segmented through the above feature map with the pixel tag, so as to output the defect position information.

Optionally, in some embodiments, before step 210, the method 200 may further include: obtaining a plurality of known defect sample images, and training an eigenvector space by using the known defect sample images, so as to obtain the trained eigenvector space.

It should be understood that the plurality of known defect sample images can be used as a training set to train the eigenvector space, and the plurality of known defect sample images need to include all known defect types, so as to train the eigenvector space with comprehensive defect types and reasonable distribution.

Optionally, in some embodiments, known defect eigenvectors of the plurality of known defect sample images can be obtained by the encoding module, and then a distance between the known defect eigenvectors of a same type is minimized and a distance between the known defect eigenvectors of different types is maximized in a metric learning function.

Exemplarily, training the eigenvector space using the known defect sample images as the training set may include four steps below.

In step 1, known defect eigenvectors of the known defect sample images are extracted by the encoding module.

In step 2, an eigenvector space model is initialized.

In step 3, defect eigenvectors of known defects are input to the eigenvector space model.

In step 4, a distance between the known defect eigenvectors of a same type is minimized and a distance between the known defect eigenvectors of different types is maximized by using a metric learning function as a loss function.

In step 5, parameters of the eigenvector space model are updated based on a loss calculation result.

The above steps 3 to 5 are repeated for continuous iterative optimization until convergence, and then the trained eigenvector space, namely, the optimized eigenvector space is output. It should be understood that the trained eigenvector space can determine which defect type the defect in the image to be detected belongs to, and also determine whether the image to be detected includes unknown defects.

According to the embodiment of the present application, the defect eigenvectors of the known defects can be fully extracted using the encoding module, such that compared with a conventional method, the eigenvector space with reasonable distribution can be trained using fewer sample images.

In the embodiment of the present application, the metric learning function as the loss function can minimize the distance between the known defect eigenvectors of the same type and maximize the distance between the known defect eigenvectors of different types, such that the eigenvector space is optimized, the complex defects occurring in the production processes of the product can be accurately detected, and the unknown defects or the abnormal defects can be discovered in a timely manner, so as to reduce the product risk and improve the product yield.

The method embodiment in the embodiments of the present application have been described in detail above. A device embodiment in the embodiments of the present application is described below. The device embodiment corresponds to the method embodiment, such that for the parts not described in detail, reference can be made to those in the previous method embodiment. A device can implement any possible implementation in the above method.

Figure 4:
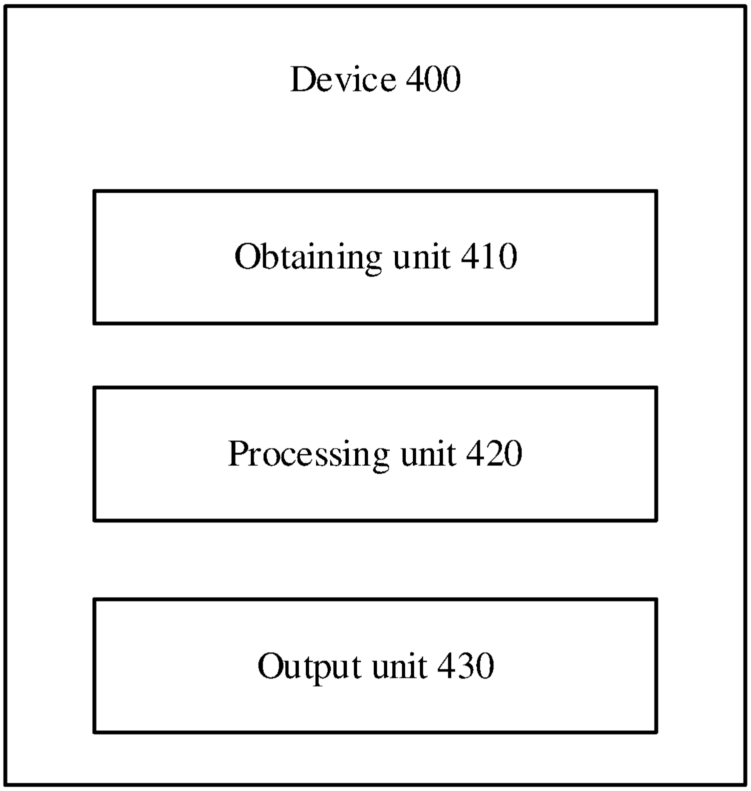
FIG. 4 is a schematic structure block diagram of a device for defect detection according to an embodiment of the present application.

FIG. 4 is a schematic block diagram of a device 400 for defect detection according to an embodiment of the present application. The device 400 can perform the above method for defect detection according to the embodiment of the present application. For example, the device 400 may be the foregoing execution equipment 110.

As shown in FIG. 4, the device includes:

- an obtaining unit 410, configured to obtain a defect eigenvector of an image to be detected; and
- a processing unit 420, configured to calculate a similarity score of the image to be detected for each known defect type according to the defect eigenvector, and to perform defect classification on the image to be detected according to the similarity scores.

Optionally, in some embodiments, the processing unit 420 is further configured to: map the defect eigenvector into a trained eigenvector space, where the trained eigenvector space comprises a distribution position of a defect eigenvector of the known defect type; and calculate a distance between the defect eigenvector and the defect eigenvector of the known defect type, so as to obtain the similarity score of the image to be detected for each known defect type.

Optionally, in some embodiments, the device 400 further includes an output unit 430, where the output unit 430 is configured to: if a maximum similarity score in the similarity scores is not less than a similarity threshold, output a defect type corresponding to the maximum similarity score; or if the similarity scores are all less than the similarity threshold, output unknown defect types.

Optionally, in some embodiments, the output unit 430 is further configured to output the similarity scores corresponding to the defect types.

Optionally, in some embodiments, the obtaining unit 410 is further configured to obtain the defect eigenvector by an encoding module.

Optionally, in some embodiments, the encoding module includes a plurality of encoding sublayers, the plurality of encoding sublayers being connected by a maximum pooling layer; and the processing unit 420 is configured to input the image to be detected to the encoding module, so as to obtain feature maps of the sublayers that correspond to the plurality of encoding sublayers, and to convert a feature map of a final sublayer in the feature maps of the sublayers into the defect eigenvector.

Optionally, in some embodiments, the obtaining unit 410 is further configured to obtain defect position information of the image to be detected by a decoding module.

Optionally, in some embodiments, the decoding module includes a plurality of decoding sublayers, the plurality of decoding sublayers being connected through deconvolution and corresponding to the plurality of encoding sublayers; and the processing unit 420 is further configured to input the defect eigenvector to the decoding module, so as to obtain feature maps corresponding to the plurality of decoding sublayers, where a feature map of a final sublayer in the plurality of decoding sublayers includes the defect position information.

Optionally, in some embodiments, the obtaining unit 410 is further configured to obtain a plurality of known defect sample images; and the processing unit 420 is further configured to train an eigenvector space by using the known defect sample images, so as to obtain the trained eigenvector space.

Optionally, in some embodiments, the processing unit 420 is further configured to: obtain known defect eigenvectors of the plurality of known defect sample images by the encoding module; and minimize a distance between the known defect eigenvectors of a same type and maximize a distance between the known defect eigenvectors of different types in a metric learning function.

Figure 5:
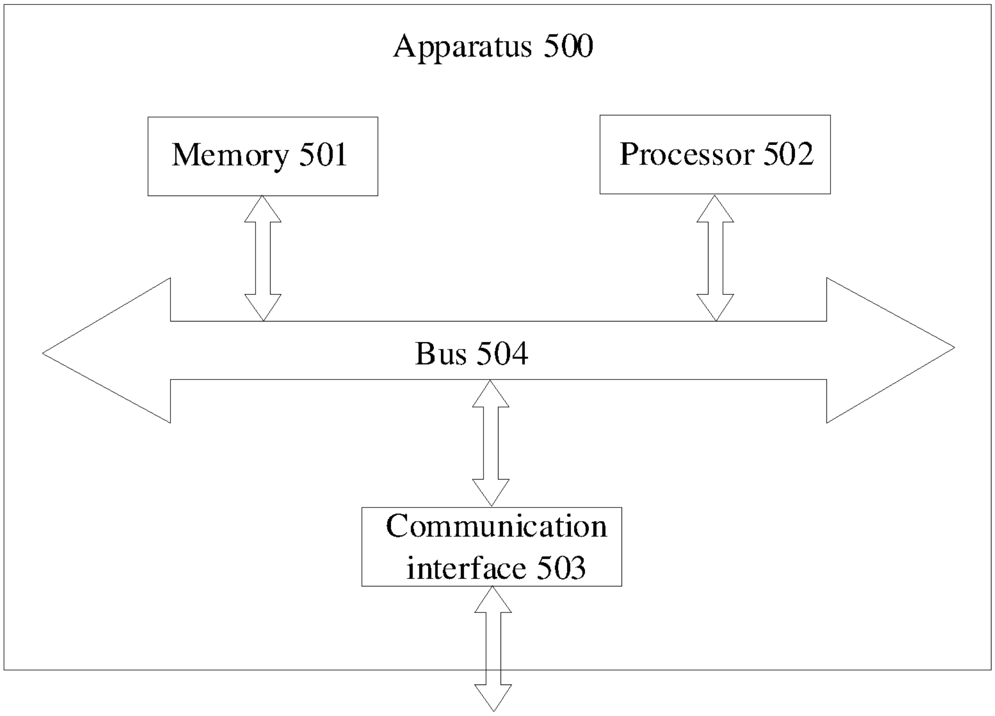
FIG. 5 is a schematic structural diagram of hardware in an apparatus for defect detection according to an embodiment of the present application.

FIG. 5 is a schematic structural diagram of hardware in an apparatus for defect detection according to an embodiment of the present application. The device 500 for defect detection shown in FIG. 5 includes a memory 501, a processor 502, a communication interface 503, and a bus 504. The processor 501, the memory 502, and the communication interface 503 are in communication connection with one another through the bus 504.

The memory 501 may be a read-only memory (ROM), a static storage device, or a random access memory (RAM). The memory 501 can store a program. When the program stored in the memory 501 is executed by the processor 502, the processor 502 and the communication interface 503 are configured to perform steps of the method for defect detection according to the embodiment of the present application.

The processor 502 may be a general-purpose central processing unit (CPU), a microprocessor, an application specific integrated circuit (ASIC), a graphics processing unit (GPU), or one or more integrated circuits, and is configured to execute a relevant program, so as to implement the function that needs to be executed by a unit in the device for defect detection according to the embodiment of the present application, or perform the method for defect detection according to the embodiment of the present application.

The processor 502 may also be an integrated circuit chip capable of processing signals. In the implementation process, steps of the method for defect detection according to the embodiment of the present application can be completed by an integrated logic circuit of hardware in the processor 502 or instructions in the form of software.

The above processor 502 may also be a general-purpose processor, a digital signal processor (DSP), an ASIC, a field programmable gate array (FPGA) or other programmable logic devices, a discrete gate or a transistor logic device, and a discrete hardware component. The methods, steps and logic block diagrams disclosed in the embodiment of the present application can be implemented or performed. The general-purpose processor may be a microprocessor or any conventional processor. It can be directly reflected that steps of the method disclosed by the embodiment of the present application are completed through execution of a hardware processor or a combination of hardware and software modules in the processor. The software module may be located in a mature storage medium in the fields of random access memories, flash memories, read-only memories, programmable read-only memories or electrically erasable programmable memories, registers, etc. The storage medium is located in the memory 501. The processor 502 reads information in the memory 501, and completes the function that needs to be executed by the unit included in the device for defect detection according to the embodiment of the present application, or performs the method for defect detection according to the embodiment of the present application in combination with its hardware.

The communication interface 503 is, but not limited to, a transceiver device such as a transceiver for implementing communication between the device 500 and other devices or communication networks. For example, flow data of an unknown device can be obtained through the communication interface 503.

The bus 504 may include a channel for transmitting information among various components (such as the processor 501, the processor 502, and the communication interface 503) in the device 500.

It should be noted that although the above device 500 only shows the memory, the processor, and the communication interface, it should be understood by those skilled in the art that the device 500 may further include other components necessary for normal operation in the specific implementation process. Moreover, it should be understood by those skilled in the art according to specific requirements that the device 500 may further include hardware components for implementing other additional functions. In addition, it should be understood by those skilled in the art that the device 500 may only include components necessary to implement the embodiment of the present application, without necessarily including all components shown in FIG. 5.

An embodiment of the present application further provides a computer-readable storage medium, storing program codes for executing the device, where the program codes include instructions for performing steps in the above method for defect detection.

An embodiment of the present application further provides a computer program product, where the computer program product includes a computer program stored on a computer-readable storage medium, the computer program including program instructions; and the program instructions, when executed by a computer, cause the computer to perform the above method for defect detection.

The above computer-readable storage medium may be a transient computer-readable storage medium or a non-transient computer-readable storage medium.

It can be clearly understood by those skilled in the art that for the convenience and conciseness of description, the specific working process of the device described above can refer to the corresponding process in the foregoing method embodiment and will not be repeated herein.

In the several embodiments provided in the present application, it should be understood that the device and method disclosed may be implemented in other ways. For example, the device embodiment described above is merely schematic. For example, the division of units is merely a logical function division. During actual implementation, there may be other division ways. For example, a plurality of units or components may be combined or integrated to another system, or some features may be ignored or not implemented. In addition, mutual coupling, direct coupling or communication connection shown or discussed may be indirect coupling or communication connection of devices or units through some interfaces, and may be in electrical, mechanical or other forms.

The terms used in the present application are merely used to describe the embodiments and are not intended to limit the claims. As used in the description of the embodiments and claims, "one" and "the" in a singular form are intended to equally include a plural form, unless the context clearly indicates otherwise. Similarly, the term "and/or" used in the present application refers to including any and all possible combinations of one or more associated listed items. In addition, when used in the present application, the term "include/comprise" refers to the existence of the features, wholes, steps, operations, elements, and/or components stated, but does not exclude the existence or addition of one or more other features, wholes, steps, operations, elements, components, and/or groups thereof.

The various aspects, embodiments, implementations, or features in the embodiments described can be used individually or in any combination. The various aspects in the embodiments described can be implemented by software, hardware, or a combination of software and hardware. The embodiments described may also be embodied by a computer-readable medium storing computer-readable codes, where the computer-readable codes include instructions that can be executed by at least one computing device. The computer-readable medium can be associated with any data storage device capable of storing data, where the data can be read by a computer system. The computer-readable storage medium used as an example may include a read-only memory, a random access memory, a compact disc read-only memory (CD-ROM), a hard disk drive (HDD), a digital video disc (DVD), a magnetic tape, an optical data storage device, etc. The computer-readable storage medium may also be distributed in computer systems connected through a network, such that computer-readable codes can be stored in a distributed manner and executed.

The above technical description can refer to the accompanying drawings that form a part of the present application, and the implementations in accordance with the embodiments described are shown in the accompanying drawings through the description. Although these embodiments are sufficiently detailed to enable those skilled in the art to implement them, they are non-restrictive. In this case, other embodiments can be used and changes can be made without departing from the scope of the embodiments described. For example, the order of operations described in the flowchart is non-restrictive, such that the order of two or more operations illustrated in the flowchart and described according to the flowchart can be changed according to several embodiments. As another example, in several embodiments, one or more operations illustrated in the flowchart and described according to the flowchart are optional or deletable. In addition, some steps or functions can be added into the embodiments disclosed, or two or more sequences of steps can be replaced. All these changes are considered to be included in the disclosed embodiments and claims.

Furthermore, the terms are used in the above technical description to provide a thorough understanding of the embodiments described. However, full details are not required to implement the embodiments described. Therefore, the above description of the embodiments is presented for illustration and description. The embodiments presented in the above description and the examples disclosed according to these embodiments are provided separately to add the context and assist in understanding the embodiments described. The above specification is not intended to be exhaustive or to limit the embodiments described to the precise form of the present application. According to the above teachings, several modifications, selections, and changes are feasible. In some cases, the well-known processing steps are not described in detail to avoid unnecessary impact on the embodiments described. Although the present application has been described with reference to preferred embodiments, various improvements can be made thereto and equivalents can be used for replacement of members therein without departing from the scope of the present application. Especially, various technical features mentioned in each embodiment can be combined in any way as long as there is no structural conflict. The present application is not limited to particular embodiments disclosed herein but includes all technical solutions falling within the scope of the claims.

What is claimed is:

1. A method for defect detection, performed by a defect detection device that comprises a storage medium storing program codes and a processor configured to execute the program codes, the method comprising:
- obtaining a defect eigenvector of an image to be detected by using an encoding module of the program codes;
- calculating a similarity score of the image to be detected for each known defect type according to the defect eigenvector; and
- performing defect classification on the image to be detected according to the similarity score;
- wherein the encoding module comprises a plurality of encoding sublayers, the plurality of encoding sublayers being connected by a maximum pooling layer; and
- wherein obtaining the defect eigenvector of the image to be detected by using the encoding module comprises:
  - inputting the image to be detected to the encoding module, so as to obtain feature maps of sublayers that correspond to the plurality of encoding sublayers; and
  - converting a feature map of a final sublayer in the feature maps of the sublayers into the defect eigenvector.

2. The method according to claim 1, wherein calculating the similarity score of the image to be detected for each known defect type according to the defect eigenvector comprises:
- mapping the defect eigenvector into a trained eigenvector space, wherein the trained eigenvector space comprises a distribution position of a defect eigenvector of a known defect type; and
- calculating a distance between the defect eigenvector and the defect eigenvector of the known defect type, so as to obtain the similarity score of the image to be detected for each known defect type.

3. The method according to claim 2, wherein the performing defect classification on the image to be detected according to the similarity scores comprises:
- when a maximum similarity score in similarity scores is not less than a similarity threshold, outputting a defect type corresponding to the maximum similarity score; or
- when the similarity scores are all less than the similarity threshold, outputting an unknown defect type.

4. The method according to claim 3, further comprising:
- outputting the similarity score corresponding to the defect type.

5. The method according to claim 1, further comprising:
- obtaining defect position information of the image to be detected by using a decoding module of the program codes.

6. The method according to claim 5, wherein the decoding module comprises a plurality of decoding sublayers, the plurality of decoding sublayers being connected through deconvolution and corresponding to the plurality of encoding sublayers; and wherein obtaining the defect position information of the image to be detected by using the decoding module comprises:

inputting the defect eigenvector to the decoding module, so as to obtain feature maps corresponding to the plurality of decoding sublayers, wherein a feature map of a final sublayer in the plurality of decoding sublayers comprises the defect position information.

7. The method according to claim 1, wherein before the calculating a similarity score of the image to be detected for each known defect type according to the defect eigenvector, the method further comprises:

obtaining a plurality of known defect sample images; and training an eigenvector space by using the plurality of known defect sample images, so as to obtain the trained eigenvector space.

8. The method according to claim 7, wherein the training an eigenvector space by using the plurality of known defect sample images, so as to obtain the trained eigenvector space comprises:

obtaining known defect eigenvectors of the plurality of known defect sample images by the encoding module; and minimizing a distance between the known defect eigenvectors of a same type and maximizing a distance between the known defect eigenvectors of different types in a metric learning function.

9. A device for defect detection, comprising:

a computer-readable storage medium configured to store program codes, and a processor configured to execute the program codes;

wherein by executing the program codes, the processor is configured to:

obtain a defect eigenvector of an image to be detected by using an encoding module of the program codes;

calculate a similarity score of the image to be detected for each known defect type according to the defect eigenvector; and perform defect classification on the image to be detected according to the similarity score;

wherein the encoding module comprises a plurality of encoding sublayers, the plurality of encoding sublayers being connected by a maximum pooling layer; and wherein in obtaining the defect eigenvector of the image to be detected, the processor is configured to:

input the image to be detected to the encoding module, so as to obtain feature maps of sublayers that correspond to the plurality of encoding sublayers; and convert a feature map of a final sublayer in the feature maps of the sublayers into the defect eigenvector.

10. The device according to claim 9, wherein the processor is further configured to:

map the defect eigenvector into a trained eigenvector space, wherein the trained eigenvector space comprises a distribution position of a defect eigenvector of a known defect type; and calculate a distance between the defect eigenvector and the defect eigenvector of the known defect type, so as to obtain the similarity score of the image to be detected for each known defect type.

11. The device according to claim 10, further comprising an output interface coupled with the processor, wherein the output interface is configured to:

when a maximum similarity score in similarity scores is not less than a similarity threshold, output a defect type corresponding to the maximum similarity score; or when the similarity scores are all less than the similarity threshold, output an unknown defect type.

12. The device according to claim 11, wherein the output interface is further configured to output the similarity score corresponding to the defect type.

13. The device according to claim 9, wherein the processor is further configured to obtain defect position information of the image to be detected by using a decoding module of the program codes.

14. The device according to claim 13, wherein the decoding module comprises a plurality of decoding sublayers, the plurality of decoding sublayers being connected through deconvolution and corresponding to the plurality of encoding sublayers; and wherein in obtaining the defect position information of the image to be detected the processor is further configured to:

input the defect eigenvector to the decoding module, so as to obtain feature maps corresponding to the plurality of decoding sublayers, wherein a feature map of a final sublayer in the plurality of decoding sublayers comprises the defect position information.

15. An apparatus for defect detection, comprising a processor and a memory, wherein the memory is configured to store a program codes, and the processor is configured to call the program codes from the memory and run the program codes to perform a method that comprises:

obtaining a defect eigenvector of an image to be detected by using an encoding module of the program codes;

calculating a similarity score of the image to be detected for each known defect type according to the defect eigenvector; and performing defect classification on the image to be detected according to the similarity score;

wherein the encoding module comprises a plurality of encoding sublayers, the plurality of encoding sublayers being connected by a maximum pooling layer; and wherein obtaining the defect eigenvector of the image to be detected by using the encoding module comprises:

inputting the image to be detected to the encoding module, so as to obtain feature maps of sublayers that correspond to the plurality of encoding sublayers; and converting a feature map of a final sublayer in the feature maps of the sublayers into the defect eigenvector.

* * * * *